United States Patent
Shiohara et al.

(10) Patent No.: US 12,436,772 B2
(45) Date of Patent: Oct. 7, 2025

(54) ELECTRONIC CONTROL UNIT (ECU) PROGRAM FOR DETERMINING REAL TIME POST STARTUP SOFTWARE VERSION INCONSISTENCY AFTER SOFTWARE UPDATE

(71) Applicant: TOYOTA JIDOSHA KABUSHIKI KAISHA, Toyota (JP)

(72) Inventors: Kazuyoshi Shiohara, Nagoya (JP); Tomoki Shibutani, Nisshin (JP); Takayuki Fujimoto, Seto (JP); Masaki Miyake, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 235 days.

(21) Appl. No.: 18/297,075

(22) Filed: Apr. 7, 2023

(65) Prior Publication Data

US 2023/0418619 A1 Dec. 28, 2023

(30) Foreign Application Priority Data

Jun. 22, 2022 (JP) ................................. 2022-100399

(51) Int. Cl.
*G06F 9/4401* (2018.01)
*G06F 8/65* (2018.01)

(52) U.S. Cl.
CPC .............. *G06F 9/4401* (2013.01); *G06F 8/65* (2013.01)

(58) Field of Classification Search
CPC .................................. G06F 9/4401; G06F 8/65
See application file for complete search history.

(56) References Cited

U.S. PATENT DOCUMENTS

| | | | | |
|---|---|---|---|---|
| 8,813,061 | B2* | 8/2014 | Hoffman | G06F 8/65 717/172 |
| 9,639,344 | B2* | 5/2017 | Rockwell | G06F 8/65 |
| 10,387,139 | B2* | 8/2019 | Fox | B60W 50/04 |
| 11,561,782 | B2* | 1/2023 | Nidugala | G06F 9/453 |
| 11,604,636 | B2* | 3/2023 | Miyake | G06F 8/65 |
| 11,907,698 | B2* | 2/2024 | Harata | H04W 4/14 |
| 2017/0286099 | A1* | 10/2017 | Wilkinson | G06F 8/65 |
| 2019/0278582 | A1 | 9/2019 | Miyake et al. | |

FOREIGN PATENT DOCUMENTS

JP 2019-159399 A 9/2019

* cited by examiner

*Primary Examiner* — Tammara R Peyton
(74) *Attorney, Agent, or Firm* — Oblon, McClelland, Maier & Neustadt, L.L.P.

(57) ABSTRACT

A control device constituting a system of a vehicle includes a central processing unit (CPU). The CPU is configured to store first software for executing a predetermined process. The predetermined process includes a first process for implementing a first function of the vehicle in cooperation with another control device constituting the system. The CPU is configured to receive information about second software stored in the other control device from the other control device before execution of the first software at startup of the control device. The CPU is configured to execute a startup check process including a check process, and execute a third process when the CPU receives the information about the second software from the other control device after the CPU has started executing the first software. The third process includes stopping or forbidding execution of the first process.

15 Claims, 9 Drawing Sheets

FIG. 3

|  | < BEFORE UPDATE > | < AFTER UPDATE > |
|---|---|---|
| REPRESENTATIVE ECU 200 | A00001 | A00002 |
| COOPERATIVE ECU 210 | B00001 | B00002 |
| COOPERATIVE ECU 220 | C00001 | C00002 |

FIG. 5

|  | CONSISTENT | INCONSISTENT | ABNORMAL |
|---|---|---|---|
| FIRST FUNCTION | PERMITTED | UNPERMITTED | UNPERMITTED |
| SECOND FUNCTION | PERMITTED | UNPERMITTED | UNPERMITTED |
| THIRD FUNCTION | PERMITTED | PERMITTED | UNPERMITTED |

ELECTRONIC CONTROL UNIT (ECU) PROGRAM FOR DETERMINING REAL TIME POST STARTUP SOFTWARE VERSION INCONSISTENCY AFTER SOFTWARE UPDATE

CROSS-REFERENCE TO RELATED APPLICATION

This application claims priority to Japanese Patent Application No. 2022-100399 filed on Jun. 22, 2022, incorporated herein by reference in its entirety.

BACKGROUND

1. Technical Field

The present disclosure relates to a control device constituting a vehicle system, a control method, and a recording medium.

2. Description of Related Art

Vehicles each include an on-board system that includes a plurality of actuators and a plurality of control devices that controls the actuators. Software is installed in each of the control devices. Functions of the vehicle are implemented by the control devices executing the software to control the actuators. After the vehicle is supplied to the market, it receives software update programs provided, for example, over the air (OTA). The software is updated based on the received update programs. As a result, the functions of the vehicle are modified or any functions are added, for example. In order to modify or add functions to be performed in cooperation among the control devices, such as various types of driving assistance typified by autonomous driving, it is necessary to update the software products of all the target control devices. Further, it is necessary to check whether the update has properly been executed in each of the control devices.

For example, in Japanese Unexamined Patent Application Publication No. 2019-159399 (JP 2019-159399 A), one specific on-board device out of a plurality of on-board devices acquires software versions of the other on-board devices when the vehicle is powered ON. The specific on-board device compares the software version of the specific on-board device with the acquired software versions of the other on-board devices to make determination on the consistency of the software versions.

SUMMARY

The software update may be executed, for example, at the next startup of the on-board system in order to simultaneously switch the software products from the software products before the update in a plurality of electronic control units (ECUs). In that case, whether the software products have properly been updated is also checked at the next startup of the on-board system.

If only a part of the control devices is restarted due to some trouble such as momentary power failure in any of the control devices before the next startup of the on-board system, however, the software update is executed only on the restarted part of the control devices. In this case, software inconsistency such as software version mismatch occurs among the control devices at least until the next startup of the on-board system. When the software inconsistency has occurred, there is a possibility that the processes to be executed in cooperation among the control devices cannot be executed properly.

The present disclosure provides a technology for suppressing the execution of the processes to be executed in cooperation among the control devices when the software inconsistency has occurred.

(1) A control device constituting a system of a vehicle according to a first aspect of the present disclosure includes a central processing unit (CPU). The CPU is configured to store first software for executing a predetermined process. The predetermined process includes a first process for implementing a first function of the vehicle in cooperation with another control device constituting the system. The control device and the other control device are each configured to update software at startup when software update is available. The CPU is configured to execute the first software. The CPU is configured to receive information about second software stored in the other control device from the other control device before execution of the first software at the startup of the control device. The information about the second software includes a program for executing the first process. The CPU is configured to execute a startup check process including a check process for checking consistency between the first software and the second software. The CPU is configured to execute a third process when the CPU receives the information about the second software from the other control device after the CPU has started executing the first software. The third process includes stopping or forbidding execution of the first process.

With the above configuration, the control device executes the startup check process at the startup and checks the consistency between the first software and the second software by the check process. The control device and the other control device are each configured to update the software at the startup when software update is available. Therefore, when the consistency can be checked by the startup check process, it can be said that the software consistency is maintained onward as long as the control devices are active. When the information about the second software is received from the other control device after the start of the execution of the first software, it is assumed that the other control device has been restarted. Along with the restart, the other device may update the second software. That is, the first software and the second software may be inconsistent. The CPU stops or forbids the execution of the first process when the information about the second software is received from the other control device after the start of the execution of the first software. Thus, when the control device is executing the first process, the first process is stopped. When the control device is not executing the first process, the first process will not be executed after the control device has received the information about the second software from the other control device. Thus, it is possible to suppress the execution of the first process when the first software and the second software are inconsistent.

(2) In the control device according to the first aspect of the present disclosure, the information about the second software may be version information of the second software. The CPU may be configured to check the consistency based on a combination of a version of the first software and a version of the second software in the startup check process.

With the above configuration, the software consistency is checked based on the software versions. Therefore, the software consistency can be checked with high accuracy.

(3) In the control device according to the first aspect of the present disclosure, the CPU may be configured to permit the execution of the first process when a result of the check process shows consistency, and forbid the execution of the first process when the result of the check process shows inconsistency.

With the above configuration, it is possible to suppress the execution of the first process when the software versions are inconsistent.

(4) In the control device according to the first aspect of the present disclosure, the CPU may be configured to, in the startup check process, forbid the execution of the first process when the CPU is not able to receive the information about the second software within a predetermined period after start of the startup check process.

When the CPU has not received the information about the second software within the predetermined period after the CPU has started the startup check process, it is assumed that any abnormality has occurred in the system. In this case, the execution of the first process is forbidden. As a result, it is possible to suppress the execution of the first process when the abnormality has occurred.

(5) In the control device according to the first aspect of the present disclosure, the CPU may be configured to, in the startup check process, transmit a signal including information indicating the result of the check process to the other control device.

For example, the other control device determines whether the first process is executable based on the information indicating the result of the check process from the control device. By transmitting the signal including the information indicating the result of the check process from the control device to the other control device, the other control device can determine whether the first process is executable.

(6) In the control device according to the first aspect of the present disclosure, the predetermined process may further include a second process for implementing a second function of the vehicle by the control device alone. The CPU may be configured to permit the execution of the first process and the second process when a result of the check process shows consistency. The CPU may be configured to forbid the execution of the first process and permit the execution of the second process when the result of the check process shows inconsistency. The CPU may be configured to forbid the execution of the first process and the second process when the CPU is not able to receive the information about the second software within a predetermined period after start of the startup check process.

With the above configuration, when the result of the check process shows the inconsistency, the first process to be executed in cooperation with the other control device is forbidden, and the second process to be executed by the control device alone is permitted. By permitting the execution of the second process that can be executed even when the result of the check process shows the inconsistency, it is possible to suppress excessive restriction on the execution of the process. When it is assumed that the system has an abnormality such as failure in reception of the information about the second software within the period after the start of the startup check process, the first process and the second process are forbidden. Thus, it is possible to suppress the execution of the inappropriate process.

(7) A control device according to a second aspect of the present disclosure constitutes a system of a vehicle. The control device includes a central processing unit (CPU). The CPU is configured to store software for executing a predetermined process. The predetermined process includes a first process for implementing a first function of the vehicle in cooperation with another control device constituting the system. The control device and the other control device are each configured to update software at startup when software update is available. The CPU is configured to execute the software. The CPU is configured to execute a startup check process before execution of the software at the startup of the control device. The startup check process includes: transmitting information about the software to the other control device; receiving a first signal indicating a result of a check process executed by the other control device using the information about the software; and determining whether the first process is executable based on the first signal. The check process is a process for checking software consistency between the control device and the other control device. The CPU is configured to execute a third process when the CPU receives, from the other control device, a second signal indicating a possibility that software inconsistency has occurred between the control device and the other control device after the CPU has started executing the software. The third process includes stopping or forbidding execution of the first process.

With the above configuration, the CPU of the control device executes the startup check process at the startup and transmits the information about the software to the other control device. In response, the CPU receives the first signal indicating the result of the check process from the other control device. Then, the CPU can check the software consistency based on the first signal, and appropriately determine whether the first process is executable. The CPU stops or forbids the execution of the first process when the CPU receives, from the other control device, the second signal indicating the possibility that the software inconsistency has occurred between the control device and the other control device after the CPU has started executing the software. Therefore, it is possible to suppress the execution of the first process when the software inconsistency has occurred.

(8) In the control device according to the second aspect of the present disclosure, the CPU may be configured to, in the startup check process, transmit the information about the software to the other control device at predetermined time intervals.

In a configuration in which the information about the software is transmitted once, there is a possibility that the other control device will not acquire the information about the software, for example, when a temporary communication abnormality has occurred. With the above configuration, it is possible to increase the possibility that the other control device will acquire the information about the software when the temporary communication abnormality has occurred.

(9) In the control device according to the second aspect of the present disclosure, the CPU may be configured to, in the startup check process, stop transmitting the information about the software when the first signal is received.

With the above configuration, the transmission of the information about the software is stopped after the first signal is received. Therefore, the information about the software may be transmitted after the CPU receives the first signal, for example, in a case where the control device has been restarted. The control device is configured to update the software at the startup. Therefore, when the information about the software is received after the first signal is transmitted, the other control device can recognize the possibility of the software inconsistency.

(10) In the control device according to the second aspect of the present disclosure, the information about the software may include version information of the software.

With the above configuration, the software consistency is checked based on the software versions. Therefore, the software consistency can be checked with high accuracy.

(11) In the control device according to the second aspect of the present disclosure, the CPU may be configured to permit the execution of the first process when the first signal indicates that the result of the check process shows consistency. The CPU may be configured to forbid the execution of the first process when the first signal indicates that the result of the check process shows inconsistency.

With the above configuration, it is possible to suppress the execution of the first process when the software versions are inconsistent.

(12) In the control device according to the second aspect of the present disclosure, the CPU may be configured to, in the startup check process, forbid the execution of the first process when the CPU is not able to receive the first signal within a predetermined period after transmission of the information about the software.

When the first signal has not been received within the predetermined period after the transmission of the information about the software, it is assumed that any abnormality has occurred in the system. In this case, the execution of the first process is forbidden. Thus, it is possible to suppress the execution of the first process when the abnormality has occurred.

(13) In the control device according to the second aspect of the present disclosure, the predetermined process may further include a second process for implementing a second function of the vehicle by the control device alone. The CPU may be configured to permit the execution of the first process and the second process when the first signal indicates that the result of the check process shows consistency. The CPU may be configured to forbid the execution of the first process and permit the execution of the second process when the first signal indicates that the result of the check process shows inconsistency. The CPU may be configured to forbid the execution of the first process and the second process when the CPU is not able to receive the first signal within a predetermined period after transmission of the information about the software.

With the above configuration, when the result of the check process shows the inconsistency, the first process to be executed in cooperation with the other control device is forbidden, and the second process to be executed by the control device alone is permitted. By permitting the execution of the second process that can be executed even when the result of the check process shows the inconsistency, it is possible to suppress excessive restriction on the execution of the process. When it is assumed that the system has an abnormality such as failure in reception of the first signal within the period after the transmission of the information about the software, the CPU forbids the first process and the second process. As a result, it is possible to suppress the execution of the inappropriate process.

(14) A third aspect of the present disclosure relates to a control method for a control device constituting a system of a vehicle and including first software for executing a predetermined process. The predetermined process includes a first process for implementing a function of the vehicle in cooperation with another control device constituting the system. The control device and the other control device are each configured to update software at startup when software update is available. The control method includes receiving information about second software stored in the other control device from the other control device before execution of the first software at the startup of the control device. The information about the second software includes a program for executing the first process.

The control method includes executing a startup check process including a check process for checking consistency between the first software and the second software. The control method includes executing a third process when the control device receives the information about the second software from the other control device after the control device has started executing the first software. The third process includes stopping or forbidding execution of the first process.

(15) A recording medium according to the third aspect of the present disclosure may be configured to record a program for executing the control method.

(16) A fourth aspect of the present disclosure relates to a control method for a control device constituting a system of a vehicle and including software for executing a predetermined process. The predetermined process includes a first process for implementing a function of the vehicle in cooperation with another control device mounted on the vehicle. The control device and the other control device are each configured to update software at startup when software update is available. The control method includes executing a startup check process before execution of the software at the startup of the control device. The startup check process includes: transmitting information about the software to the other control device; receiving a first signal indicating a result of a check process executed by the other control device using the information about the software; and determining whether the first process is executable based on the first signal. The check process includes checking software consistency between the control device and the other control device. The control method includes executing a third process when the control device receives, from the other control device, a second signal indicating a possibility that software inconsistency has occurred between the control device and the other control device after the control device has started executing the software. The third process includes stopping or forbidding execution of the first process.

(17) A recording medium according to the fourth aspect of the present disclosure may be configured to record a program for executing the control method.

With the present disclosure, it is possible to suppress the execution of the processes to be executed in cooperation among the control devices when the software inconsistency has occurred.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 3 illustrates combination information of software product numbers (versions);

FIG. 5 illustrates functions to be permitted based on results of version check;

DETAILED DESCRIPTION OF EMBODIMENTS

Hereinafter, an embodiment of the present disclosure will be described in detail with reference to the drawings. The same or corresponding parts are denoted by the same signs throughout the drawings, and description thereof will not be repeated.

Figure 1:
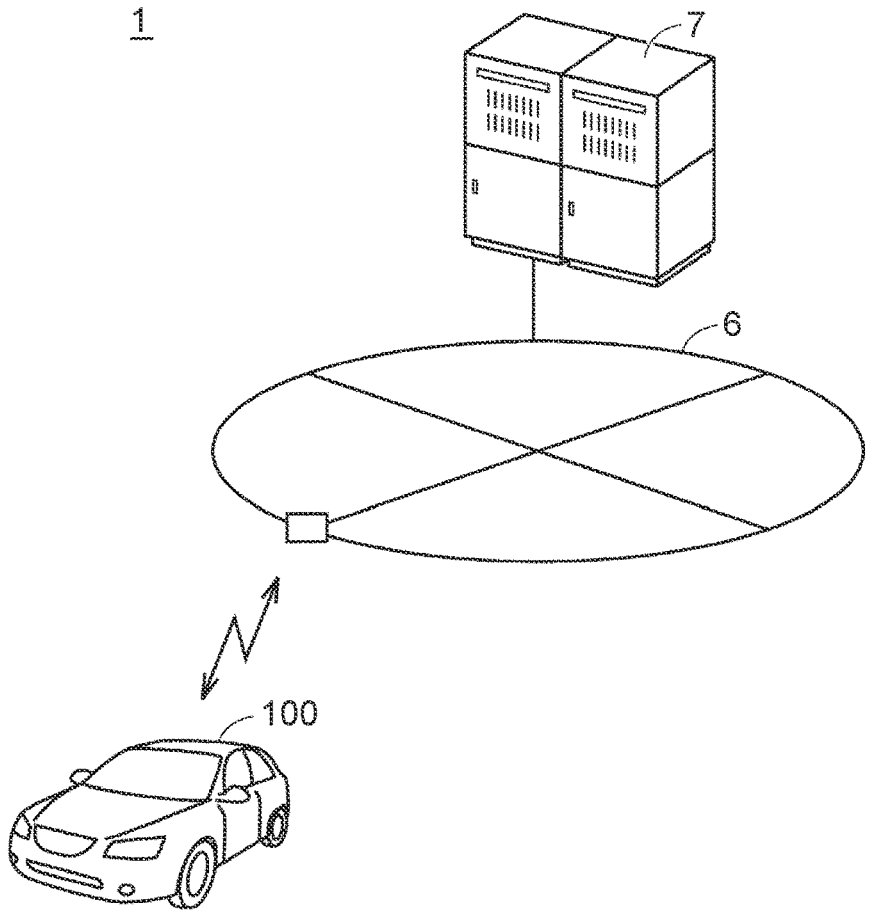
FIG. 1 illustrates an example of the configuration of a communication system.

FIG. 1 illustrates an example of the configuration of a communication system 1. The communication system 1 includes a communication network 6, a management server 7, and an electrified vehicle 100. The electrified vehicle 100 is configured to communicate with the management server 7 via the communication network 6.

The management server 7 is, for example, a computer including a central processing unit (CPU), various memories, and a communication interface. The management server 7 provides update information of various types of software to a plurality of vehicles, and manages update statuses of various types of software stored in the vehicles. FIG. 1 shows, as an example, the electrified vehicle 100 that is one of the vehicles. The following description will be made about information and the like to be exchanged between the management server 7 and the electrified vehicle 100. The same applies to information to be exchanged between the management server 7 and the other vehicles, and detailed description thereof will not be repeated.

A storage device (not shown) of the management server 7 prestores, for example, identification information (hereinafter also referred to as "vehicle ID") unique to identify the electrified vehicle 100. Various types of software stored in the electrified vehicle 100 include, for example, control programs stored in a plurality of electronic control units (ECUs) mounted on the electrified vehicle 100. The management server 7 manages identification information including version information of various types of software for each ECU of the electrified vehicle 100. As described later, the storage device of the management server 7 stores software version information of a representative ECU and pieces of software version information of the other ECUs that are included in the electrified vehicle 100 in association with the vehicle ID. The management server 7 manages the pieces of software version information by using unique product numbers. When the update information is provided to the electrified vehicle 100, the management server 7 manages the update statuses of various types of software in the electrified vehicle 100 by using the product numbers associated with the provided update information.

For example, when software with a new product number (new version) is prepared, the management server 7 requests the electrified vehicle 100 to update the software, or provides the software with the new product number to the electrified vehicle 100 in response to a request from the electrified vehicle 100.

Figure 2:
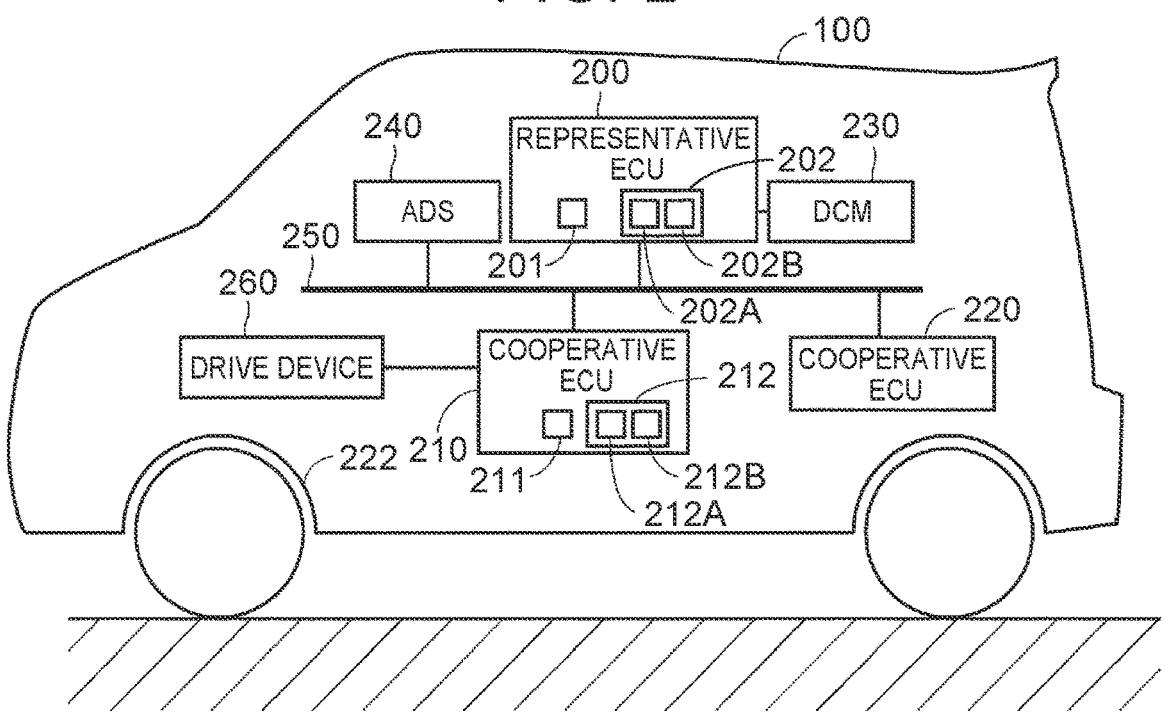
FIG. 2 schematically shows an example of the configuration of an electrified vehicle according to an embodiment.

Next, a specific configuration of the electrified vehicle 100 according to the present embodiment will be described with reference to FIG. 2. FIG. 2 schematically shows an example of the configuration of the electrified vehicle 100 according to the present embodiment. As shown in FIG. 2, the electrified vehicle 100 includes a representative ECU 200, cooperative ECUs 210 and 220, a data communication module (DCM) 230, an autonomous driving system (ADS) 240, a communication bus 250, and a drive device 260. The representative ECU 200, the cooperative ECUs 210 and 220, and the ADS 240 are connected via the communication bus 250 to communicate with each other.

The representative ECU 200 instructs the cooperative ECUs 210 and 220 to switch the software to software with an updated product number described later, and manages software update statuses of the ECUs including the representative ECU 200.

The representative ECU 200 includes a CPU 201 and a memory 202. The CPU 201 executes programs stored in the memory 202 to execute various types of control on targets to be controlled by the representative ECU 200 (for example, the DCM 230). The memory 202 includes a first storage area 202A and a second storage area 202B. Control programs for starting the representative ECU 200 are stored in both the first storage area 202A and the second storage area 202B. The representative ECU 200 sets the first storage area 202A or the second storage area 202B as a startup storage area (for example, the first storage area 202A). When starting the representative ECU 200, the representative ECU 200 is started by executing the control program stored in the set startup storage area. When the representative ECU 200 receives update information from the management server 7 via the DCM 230, the representative ECU 200 stores the control program updated by using the update information in an update storage area (for example, the second storage area 202B). The update storage area is a storage area other than the storage area set as the startup storage area. When the representative ECU 200 stores the updated program in the update storage area (for example, the second storage area 202B), the representative ECU 200 sets the update storage area as a startup storage area for the next startup. Further, the representative ECU 200 instructs the cooperative ECU 210 described later to set the update storage area as a startup storage area for the next startup.

Therefore, when the ignition (IG) of the electrified vehicle 100 is turned ON (powered ON) by a user's startup operation or the like after the IG of the electrified vehicle 100 is turned OFF (powered OFF), the representative ECU 200 and the cooperative ECUs 210 and 220 are started by executing the updated control programs stored in the startup storage areas. The storage area that was set as the startup storage area until the startup is set as an update storage area. The operation of changing the storage area from the update storage area to the startup storage area and setting it as a new startup storage area may hereinafter be referred to as "switching of the startup storage area".

The representative ECU 200 acquires the product numbers (versions) of the updated software products stored in the cooperative ECUs 210 and 220 from the management server 7 or the cooperative ECUs 210 and 220, and stores them in the memory 202.

The DCM 230 is an on-board communication module configured to wirelessly communicate with the management server 7. The DCM 230 is configured to perform two-way data communication with the management server 7 in response to a control signal from the representative ECU 200. The DCM 230 is connected to the representative ECU 200. The representative ECU 200 transmits information about the electrified vehicle 100 and various requests to the management server 7 via the DCM 230. The representative ECU 200 receives update information of various types of software from the management server 7 via the DCM 230.

The cooperative ECU 210 includes a CPU 211 and a memory 212. The CPU 211 executes programs stored in the memory 212 to execute various types of control on targets to be controlled by the cooperative ECU 210 (for example, the drive device 260). The memory 212 includes a third storage area 212A and a fourth storage area 212B. Control programs for starting the cooperative ECU 210 are stored in both the third storage area 212A and the fourth storage area 212B. The cooperative ECU 210 sets the third storage area 212A or the fourth storage area 212B as a startup storage area. When starting the cooperative ECU 210, the cooperative ECU 210 is started by executing the control program stored in the set startup storage area. When the cooperative ECU 210 receives update information from the management server 7 via the DCM 230 and the representative ECU 200 and when the cooperative ECU 210 is instructed by the representative ECU 200 to switch the startup storage area, the cooperative ECU 210 sets the update storage area as a startup storage area for the next startup.

The cooperative ECU 220 differs from the cooperative ECU 210 in terms of detection targets of sensors, control targets (for example, a steering system and a brake system), and control operations. The other configuration of the cooperative ECU 220 is similar to that of the cooperative ECU 210. Therefore, detailed description of the cooperative ECU 220 will not be repeated. When the cooperative ECU 210 and the cooperative ECU 220 are not particularly distinguished from each other, they may hereinafter be collectively referred to simply as "cooperative ECUs".

The drive device 260 is connected to the cooperative ECU 210. The drive device 260 performs a drive operation for driving the electrified vehicle 100 in response to a control signal from the cooperative ECU 210. The drive device 260 includes, for example, a motor generator, a power storage device, and a power control unit (PCU) (none of which is shown). The power storage device includes a secondary battery such as a nickel-metal hydride battery or a lithium ion battery having a liquid or solid electrolyte, or a direct current power supply such as a capacitor. The PCU converts direct current power in the power storage device into alternating current power, and supplies the alternating current power to the motor generator. The PCU also converts alternating current power generated by the motor generator into direct current power, and supplies the direct current power to the power storage device. The motor generator is a drive source of the electrified vehicle 100 and is also a power generation source. The motor generator drives driving wheels to rotate or generates electric power by the rotation of the driving wheels. The drive device 260 may further include an internal combustion engine as a drive source or a power generation source.

The ADS 240 is configured to perform autonomous driving of the electrified vehicle 100. Specifically, the ADS 240 acquires information indicating the conditions of the electrified vehicle 100 (surrounding environment) from the representative ECU 200, the cooperative ECUs 210 and 220, and various sensors. The ADS 240 creates a travel plan by using the acquired information, a destination, and the like. The ADS 240 outputs various control requests for causing the electrified vehicle 100 to travel in accordance with the created travel plan to the representative ECU 200 and the cooperative ECUs 210 and 220 that control various actuators including the drive device 260.

In the present embodiment, the ADS 240 will be described as being built into the electrified vehicle 100. For example, the ADS 240 may be an autonomous driving kit that can be attached to a predetermined position on a rooftop of the electrified vehicle 100 and can be detached from the electrified vehicle 100.

The electrified vehicle 100 is driven in an autonomous driving mode or a manual driving mode. In the autonomous driving mode, the electrified vehicle 100 can perform autonomous driving in response to a control request from the ADS 240. In the manual driving mode, the electrified vehicle 100 can be driven in response to various user's operations (accelerator operation, brake operation, and steering operation). Various actuators mounted on the electrified vehicle 100 are controlled by at least one of the representative ECU 200 and the cooperative ECUs 210 and 220. The present embodiment is directed to the exemplary configuration in which the ECUs mounted on the electrified vehicle 100 include the representative ECU 200 and the cooperative ECUs 210 and 220. The number of cooperative ECUs included in the plurality of ECUs may be changed as appropriate. The number of cooperative ECUs included in the plurality of ECUs may be one, three, or more.

In the electrified vehicle 100 configured as described above, the representative ECU 200 and the cooperative ECUs 210 and 220 execute software products to implement various functions of the electrified vehicle 100. Examples of the functions of the electrified vehicle 100 include functions implemented by executing a process in cooperation among the representative ECU 200 and the cooperative ECUs 210 and 220 (hereinafter also referred to as "system functions"), and functions implemented by executing a process in each of the representative ECU 200 and the cooperative ECUs 210 and 220 alone without cooperating with the other ECUs (hereinafter also referred to as "standalone functions").

The software products stored in the representative ECU 200 and the cooperative ECUs 210 and 220 are updated by using update information received by the DCM 230 from the management server 7. As a result, the existing functions of the software products stored in the representative ECU 200 and the cooperative ECUs 210 and 220 can be modified, or new functions can be added to the software products stored in the representative ECU 200 and the cooperative ECUs 210 and 220. To properly execute the functions (especially the system functions) of these updated software products, the representative ECU 200 executes a "startup check process". In the startup check process, the representative ECU 200 checks, for example, after the IG is turned ON, whether the combination of product numbers (versions) of the software products to be executed in the representative ECU 200 and the cooperative ECUs 210 and 220 is consistent. When the representative ECU 200 and the cooperative ECUs 210 and 220 are started by turning ON the IG, the startup check process is executed first. After completion of the startup check process, the representative ECU 200 and the cooperative ECUs 210 and 220 execute the software products for implementing the functions.

For example, when the combination of software product numbers (versions) in the representative ECU 200 and the cooperative ECUs 210 and 220 is a predetermined combination, the representative ECU 200 determines that the combination of product numbers is consistent. The representative ECU 200 acquires, from the management server 7, combination information of the software product numbers in the representative ECU 200 and the cooperative ECUs 210 and 220, and stores it in the memory 212.

FIG. 3 illustrates the combination information of the software product numbers (versions). The combination information includes combinations of versions in the representative ECU 200 and the cooperative ECUs 210 and 220 before and after update. The representative ECU 200 acquires the update information and the combination information from the management server 7 via the DCM 230, and stores the combination information in the memory 202.

For example, in the combination of versions before update, the software version of the representative ECU 200 is "A00001", the software version of the cooperative ECU 210 is "B00001", and the software version of the cooperative ECU 220 is "C00001". For example, in the combination of versions after update, the software version of the representative ECU 200 is "A00002", the software version of the cooperative ECU 210 is "B00002", and the software version of the cooperative ECU 220 is "C00002".

The functions of the electrified vehicle 100 include the system functions and the standalone functions as described above. To properly implement the system functions, it is important that the software product numbers (versions) are consistent among the representative ECU 200 and the cooperative ECUs 210 and 220.

In the startup check process, the representative ECU 200 acquires pieces of product number information (version information) of the software products stored in the startup storage areas from the cooperative ECUs 210 and 220 before executing the software product stored in the startup storage area. The cooperative ECUs 210 and 220 transmit the pieces of product number information (version information) of the software products stored in the startup storage areas to the representative ECU 200 before executing the software products stored in the startup storage areas. The representative ECU 200 refers to the combination information stored in the memory 202 to check the product number of the software product stored in the startup storage area of the representative ECU 200 and the product numbers identified by the acquired pieces of version information of the cooperative ECUs 210 and 220. When the product number of the software product stored in the startup storage area of the representative ECU 200 and the product numbers identified by the pieces of version information match the product numbers in the combination information, the representative ECU 200 determines that the startup storage areas have properly been switched in the ECUs (representative ECU 200 and cooperative ECUs 210 and 220).

When the combinations match each other, the representative ECU 200 permits execution of a process for implementing the system functions (hereinafter also referred to as "system process") and a process for implementing the standalone functions (hereinafter also referred to as "standalone process"). When the combinations do not match each other, the representative ECU 200 permits the execution of the standalone process but does not permit the system process. The processes will be described in detail with reference to FIG. 4. The system process is an example of a "first process" according to the present disclosure. The standalone process is an example of a "second process" according to the present disclosure.

Figure 4:
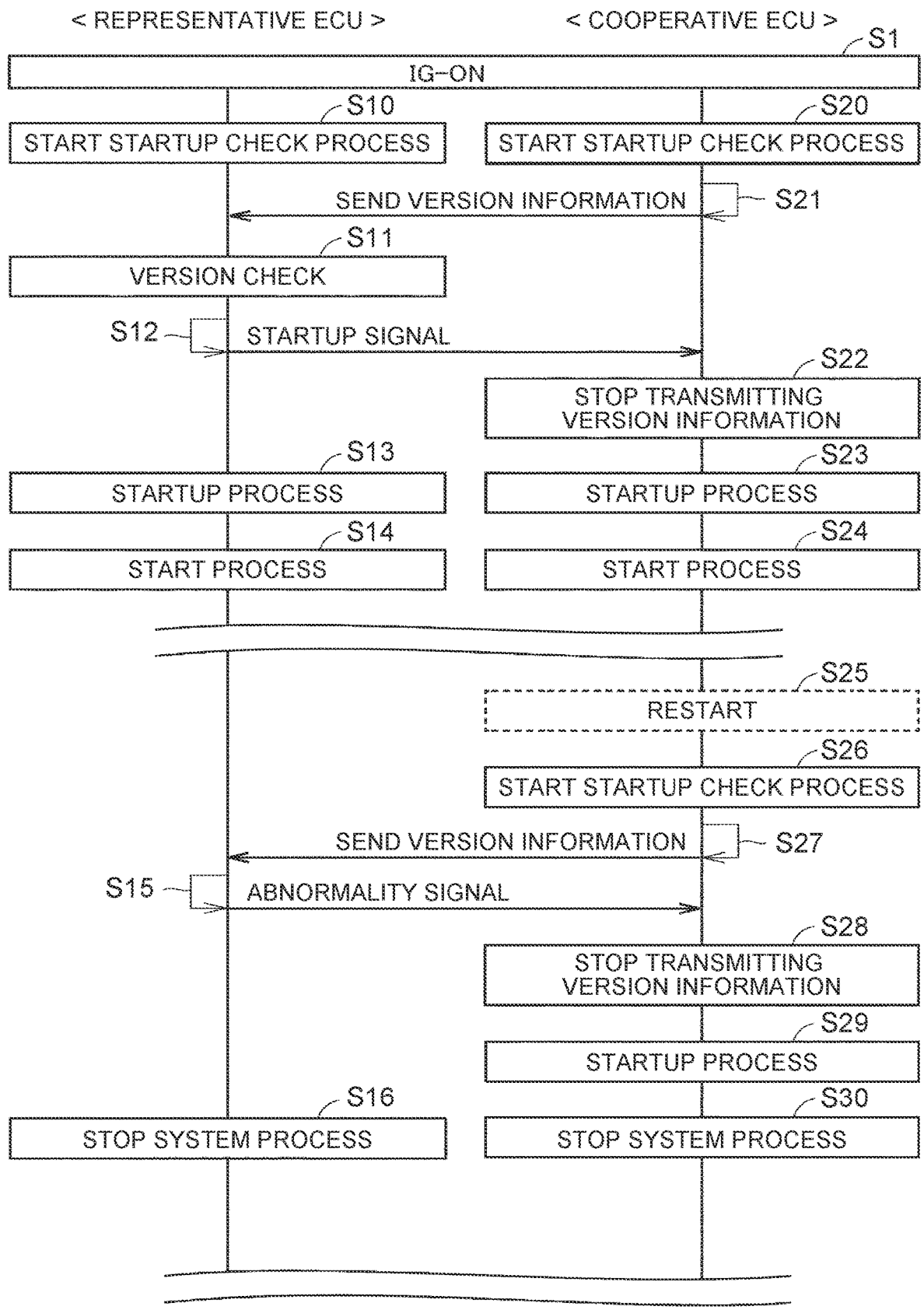
FIG. 4 illustrates an example of operations to be performed by a representative ECU and each cooperative ECU.

FIG. 4 illustrates an example of operations to be performed by the representative ECU 200 and the cooperative ECUs 210 and 220. FIG. 4 shows an operation sequence of the representative ECU 200 and each cooperative ECU.

In Step S1, the user performs a startup operation for starting the system of the electrified vehicle 100, and the electrified vehicle 100 is brought into an IG-ON state. In the IG-ON state, electric power is supplied from a power supply to the representative ECU 200 and the cooperative ECUs 210 and 220, and the representative ECU 200 and the cooperative ECUs 210 and 220 are started. When the software products are updated at this time, the startup storage areas are switched in the ECUs.

In Steps S10 and S20, the representative ECU 200 and the cooperative ECUs 210 and 220 start the startup check process. In each of the representative ECU 200 and the cooperative ECUs 210 and 220, the startup check process is executed only once when the electrified vehicle 100 is started during a period in which the electrified vehicle 100 is brought into the IG-ON state and then into the IG-OFF state.

When the cooperative ECUs 210 and 220 start the startup check process, the cooperative ECUs 210 and 220 transmit, in Step S21, pieces of product number information (version information) indicating product numbers (versions) of the software products stored in the startup storage areas to the representative ECU 200. The cooperative ECUs 210 and 220 transmit the pieces of version information to the representative ECU 200 at predetermined time intervals. A known technology can be adopted as a method for acquiring the product numbers (versions) of the software products stored in the startup storage areas, and detailed description thereof will not be given.

After the electrified vehicle 100 is brought into the IG-ON state, the representative ECU 200 executes version check in Step S11 by receiving the pieces of version information from the cooperative ECUs 210 and 220 for the first time. In the version check, the representative ECU 200 determines whether the combination of the product number (version) of the software product stored in the startup storage area of the representative ECU 200 and the product numbers (versions) identified by the pieces of version information received from the cooperative ECUs 210 and 220 is the predetermined combination. In this way, the representative ECU 200 determines whether the combination of versions is consistent. More specifically, the representative ECU 200 refers to the combination information (FIG. 3) to check the version of the software product stored in the startup storage area of the representative ECU 200 and the versions identified by the acquired pieces of version information, thereby making determination on the consistency of the combination of versions. For example, the representative ECU 200 determines that the combination is consistent when the version of the software product stored in the startup storage area of the representative ECU 200 is "A00002", the version identified by the version information received from the cooperative ECU 210 is "B00002", and the version identified by the version information received from the cooperative ECU 220 is "C00002". For example, the representative ECU 200 determines that the combination is not consistent (inconsistent) when the version of the software product stored in the startup storage area of the representative ECU 200 is "A00002" but the version identified by the version information received from the cooperative ECU 210 is "B00001" or the version identified by the version information received from the cooperative ECU 220 is "C00001". The representative ECU 200 determines that there is an abnormality when the version information has not been received from at least one of the cooperative ECUs 210 and 220 even though a predetermined period has elapsed since the startup check process in Step S10 was started (timeout). The version check is an example of a "check process" according to the present disclosure.

In Step S12, the representative ECU 200 generates startup signals based on the result of the version check (including the case of determination that there is an abnormality due to timeout). The startup signals include a first startup signal, a second startup signal, or a third startup signal. When the representative ECU 200 determines that there is consistency in the version check, the representative ECU 200 generates the first startup signals including information indicating the consistency. When the representative ECU 200 determines that there is no consistency in the version check, the representative ECU 200 generates the second startup signals including information indicating the inconsistency. When the representative ECU 200 determines that there is an abnormality in the version check, the representative ECU 200 generates the third startup signals including information indicating the abnormality. The representative ECU 200 transmits the generated startup signals to the cooperative ECUs 210 and 220.

In Step S22, the cooperative ECUs 210 and 220 stop transmitting the pieces of version information in response to reception of the startup signals. Then, the version information is not sent from each of the cooperative ECUs 210 and 220 to the representative ECU 200.

In Steps S13 and S23, the representative ECU 200 and the cooperative ECUs 210 and 220 start a startup process. Specifically, the representative ECU 200 starts the startup process based on the result of the version check. The cooperative ECUs 210 and 220 start the startup process based on the startup signals. Permitted functions are predetermined in association with the result of the version check and the startup signal.

FIG. 5 illustrates functions to be permitted based on results of the version check. FIG. 5 shows the correspondence between the results of the version check and the functions (first to third functions) to be permitted based on the results.

The first function is a function (system function) implemented by executing a process in cooperation among the representative ECU 200 and the cooperative ECUs 210 and 220. Examples of the first function include an adaptive cruise control function. The second function is a system function such as a pre-crash safety (autonomous braking) function. The third function is a function (standalone function) implemented by executing a process in the cooperative ECU 210 alone without cooperating with the other ECUs. Examples of the third function include a parking assistance function. Although the first to third functions are exemplified as the functions of the electrified vehicle 100 in the present embodiment, the functions of the electrified vehicle 100 are not limited to these functions. For example, the functions may include a function implemented by executing a process in the representative ECU 200 alone without cooperating with the other ECUs, and a function implemented by executing a process in the cooperative ECU 220 alone without cooperating with the other ECUs.

(1) When the result of the version check shows consistency, the representative ECU 200 sets all the first to third functions to a permitted state. When the first startup signals are received, the cooperative ECUs 210 and 220 set all the first to third functions to the permitted state. The first startup signal includes a command to set all the first to third functions to the permitted state. The cooperative ECUs 210 and 220 set all the first to third functions to the permitted state based on the first startup signals. Alternatively, the cooperative ECUs 210 and 220 may set all the first to third functions to the permitted state based on information that is included in the first startup signals and that indicates consistency.

(2) When the result of the version check shows inconsistency, the representative ECU 200 sets the first function and the second function to an unpermitted state, and sets the third function to the permitted state. That is, the representative ECU 200 sets the system functions to the unpermitted state, and sets the standalone function to the permitted state. The system function is a function implemented by executing a process in cooperation among the representative ECU 200 and the cooperative ECUs 210 and 220. Therefore, there is a possibility that the system function will not properly be executed when the software products are inconsistent. The standalone function is a function implemented by executing a process alone without cooperating with the other ECUs. Therefore, even if the software products are inconsistent, the standalone function can be executed properly. Thus, the first function and the second function are forbidden and the third function is permitted. When the second startup signals are received, the cooperative ECUs 210 and 220 set the first function and the second function to the unpermitted state, and set the third function to the permitted state. The second startup signal includes a command to set the first function and the second function to the unpermitted state and set the third function to the permitted state. The cooperative ECUs 210 and 220 set the first function and the second function to the unpermitted state and set the third function to the permitted state based on the second startup signals. Alternatively, the cooperative ECUs 210 and 220 may set the first function and the second function to the unpermitted state and set the third function to the permitted state based on information that is included in the second startup signals and that indicates inconsistency.

(3) When the result of the version check shows an abnormality, the representative ECU 200 sets all the first to third functions to the unpermitted state. When the third startup signals are received, the cooperative ECUs 210 and 220 set all the first to third functions to the unpermitted state. The third startup signal includes a command to set all the first to third functions to the unpermitted state. The cooperative ECUs 210 and 220 set all the first to third functions to the unpermitted state based on the third startup signals. Alternatively, the cooperative ECUs 210 and 220 may set all the first to third functions to the unpermitted state based on information that is included in the third startup signals and that indicates an abnormality.

Referring to FIG. 4 again, the representative ECU 200 and the cooperative ECUs 210 and 220 start, in Steps S14 and S24, a process including execution of the permitted function (hereinafter also referred to as "normal process"). The representative ECU 200 and the cooperative ECUs 210 and 220 do not start a process for executing the unpermitted function. Therefore, when the result of the version check shows the inconsistency or abnormality, the process for executing the system function is not started.

After the electrified vehicle 100 is brought into the IG-ON state as described above, the representative ECU 200 and the cooperative ECUs 210 and 220 start the process.

During the execution of the process, the cooperative ECU may be restarted due to the occurrence of some trouble such as momentary failure in the power supply that supplies electric power to the cooperative ECU. In this case, the restarted cooperative ECU may switch the startup storage area. Even though the consistency of the software products has been checked in the startup check process, the software products may become inconsistent afterwards. Focusing on the fact that the restarted cooperative ECU starts the startup check process and transmits version information, the representative ECU 200 executes a process of stopping or forbidding (not permitting) the system process when the version information is received after the startup process. The process including stopping or forbidding the system process is an example of a "third process" according to the present disclosure. It is assumed that the cooperative ECU 210 is restarted.

In Step S25, the cooperative ECU 210 is restarted due to the occurrence of some trouble such as momentary failure in the power supply that supplies electric power to the cooperative ECU 210.

In Step S26, the cooperative ECU 210 starts the startup check process. In Step S27, the cooperative ECU 210 that has started the startup check process transmits the product number information (version information) indicating the product number of the software product stored in the startup storage area to the representative ECU 200. The cooperative ECU 210 transmits the version information to the representative ECU 200 at predetermined time intervals.

In Step S15, the representative ECU 200 acquires the version information from the cooperative ECU 210. When the representative ECU 200 receives the version information after the start (during the execution) of the normal process, the representative ECU 200 determines that the cooperative ECU 210 that has transmitted the version information has been restarted improperly. Then, the representative ECU 200 transmits abnormality signals to the cooperative ECUs 210 and 220 without performing the version check. The abnormality signal corresponds to the third startup signal. That is, the abnormality signal includes at least information indicating an abnormality. The abnormality signal may further include a command to set all the first to third functions to the unpermitted state. The representative ECU 200 may transmit the third startup signals.

In Step S28, the cooperative ECU 210 stops transmitting the version information in response to reception of the abnormality signal. When the abnormality signal is received, the cooperative ECU 220 skips the process of Steps S28 and S29 and executes the process of Step S30.

In Step S29, the cooperative ECU 210 starts the startup process based on the abnormality signal. The process at this time is the same as the startup process executed when the third startup signal is received in Step S23.

In Steps S16 and S30, the representative ECU 200 and the cooperative ECUs 210 and 220 stop or forbids the system process. Specifically, when the representative ECU 200 and the cooperative ECU 220 are executing the system process, the representative ECU 200 and the cooperative ECU 220 stop the system process by executing a sequence for stopping the system process. When the representative ECU 200 is not executing the system process, the representative ECU 200 does not start the system process after the abnormality signals are transmitted. When the cooperative ECU 220 is not executing the system process, the cooperative ECU 220 does not start the system process after the abnormality signal is received. The representative ECU 200 and the cooperative ECU 220 continue to execute the standalone process. The cooperative ECU 210 does not start the system process, and starts the process for executing the standalone function.

Although FIG. 4 illustrates the case where the cooperative ECU is restarted, the representative ECU 200 may also be restarted.

Figure 6:
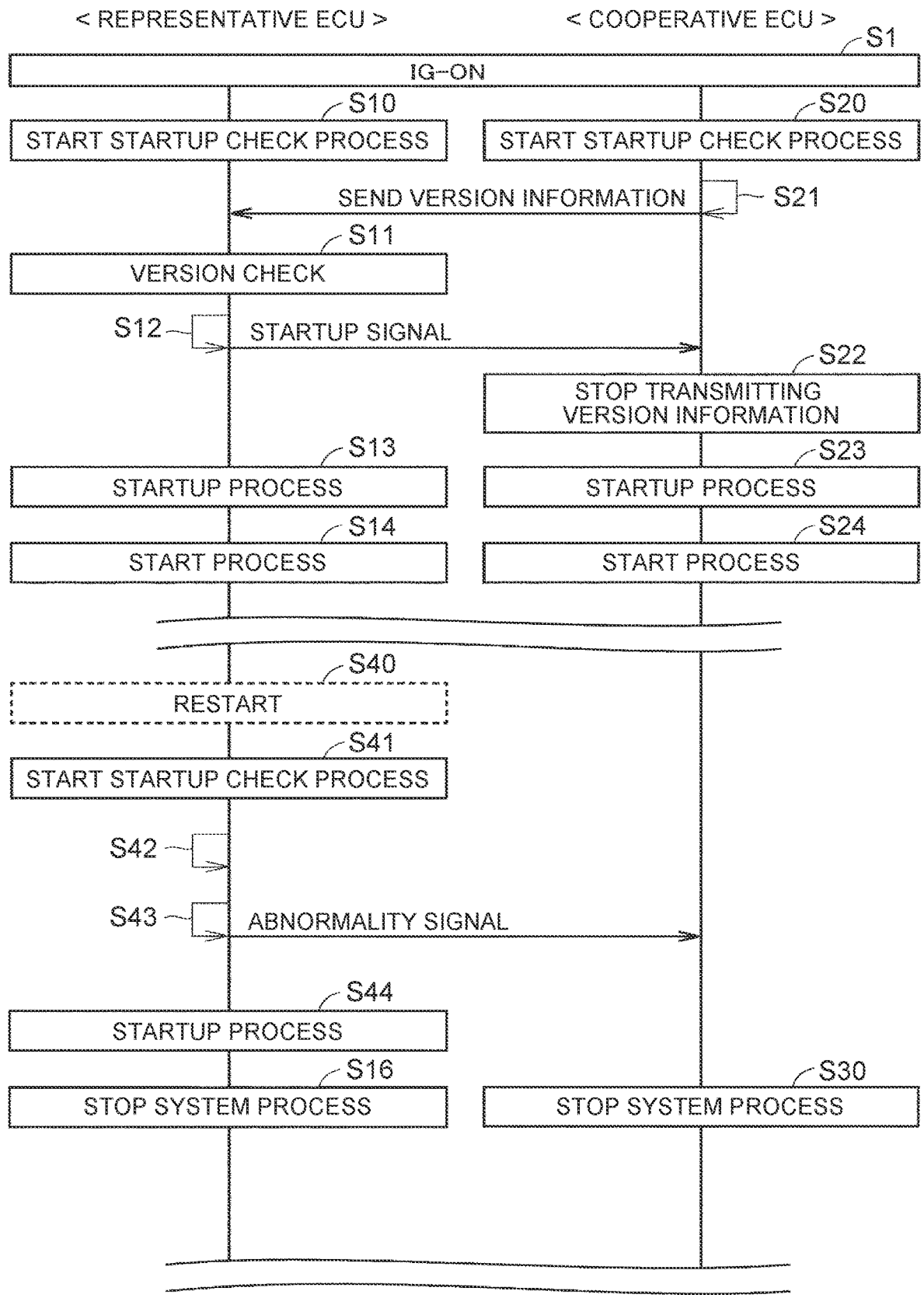
FIG. 6 illustrates another example of the operations to be performed by the representative ECU and each cooperative ECU.

FIG. 6 illustrates another example of the operations to be performed by the representative ECU 200 and the cooperative ECUs 210 and 220. FIG. 6 shows an operation sequence of the representative ECU 200 and the cooperative ECU 210. FIG. 4 illustrates the example in which the cooperative ECU 210 is restarted. FIG. 6 illustrates an example in which the representative ECU 200 is restarted. FIG. 6 shows the sequence of FIG. 4 with a change in the process after Steps S14 and S24. Therefore, the process after Steps S14 and S24 will be described.

In Step S40, the representative ECU 200 is restarted due to the occurrence of some trouble such as momentary failure in the power supply that supplies electric power to the representative ECU 200.

In Step S41, the representative ECU 200 starts the startup check process. In Step S42, the representative ECU 200 waits for pieces of version information to be transmitted from the cooperative ECUs 210 and 220. Since the cooperative ECUs 210 and 220 are not restarted, the cooperative ECUs 210 and 220 do not transmit the pieces of version information. Therefore, the predetermined period elapses (timeout) without transmitting the pieces of version information after the start of the startup check process.

In Step S43, the representative ECU 200 detects that the predetermined period has elapsed without the transmission of the pieces of version information after the start of the startup check process, and determines that there is an abnormality. Then, the representative ECU 200 transmits the abnormality signals to the cooperative ECUs 210 and 220.

In Step S44, the representative ECU 200 does not start the system process, and starts the process for executing the standalone function.

When the cooperative ECUs 210 and 220 are executing the system process, the cooperative ECUs 210 and 220 stop the system process in Step S30 by executing the sequence for stopping the system process. When the cooperative ECUs 210 and 220 are not executing the system process, the cooperative ECUs 210 and 220 do not start the system process after the abnormality signals are received. The cooperative ECUs 210 and 220 continue to execute the standalone process.

Figure 7:
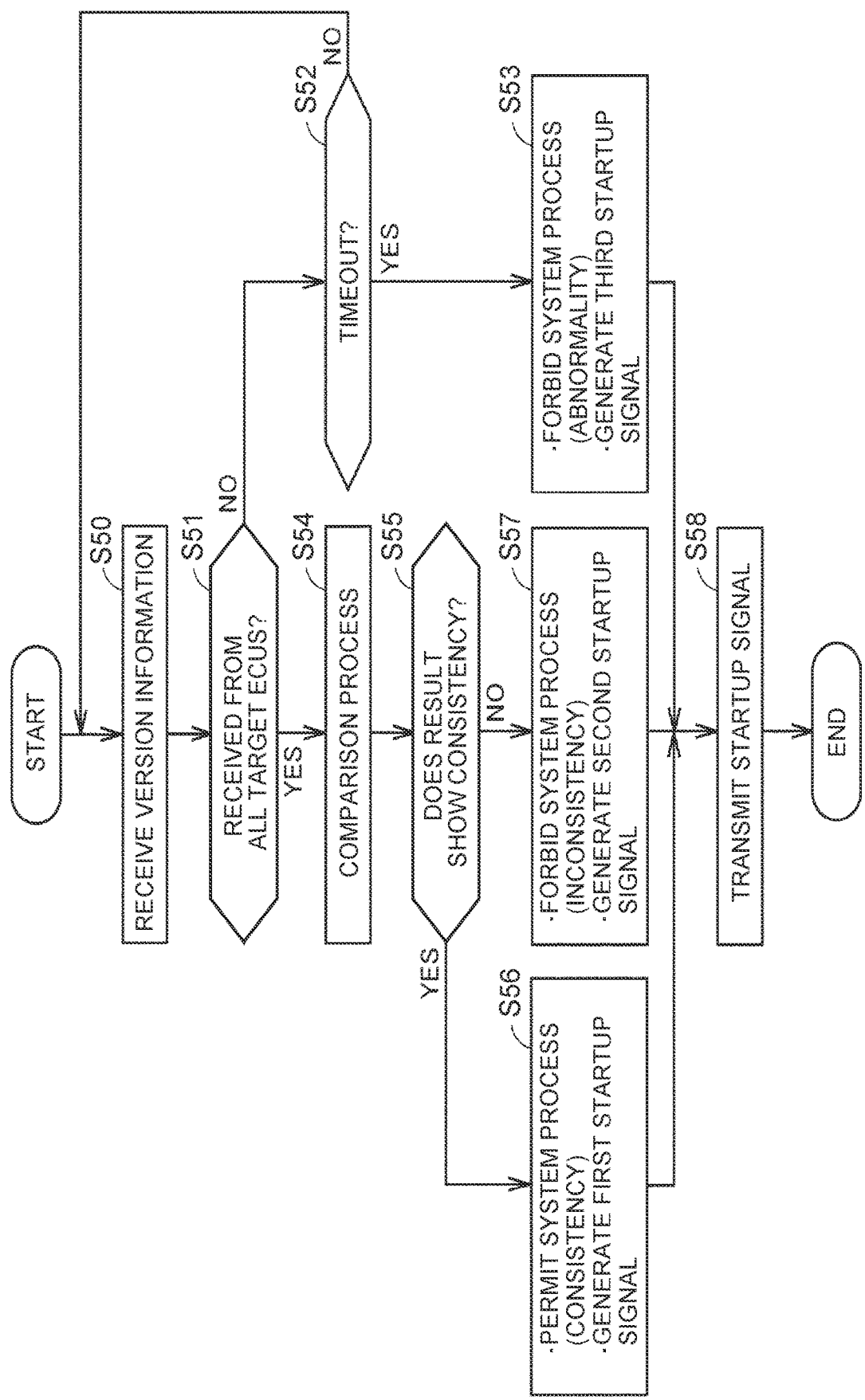
FIG. 7 is a flowchart showing a procedure of a startup check process to be executed by the representative ECU.

FIG. 7 is a flowchart showing a procedure of the startup check process to be executed by the representative ECU 200. The process in the flowchart of FIG. 7 is started when the representative ECU 200 is started. The steps in the flowchart of FIG. 7 and in a flowchart of FIG. 8 described later will be described as being realized by software processes by the representative ECU 200. A part or all of the steps may be realized by hardware (electric circuit) produced in the representative ECU 200.

In Step S50, the representative ECU 200 starts the startup check process and receives pieces of version information from the cooperative ECUs 210 and 220.

In Step S51, the representative ECU 200 determines whether the pieces of version information have been received from all the target ECUs. In the present embodiment, the target ECUs are the cooperative ECUs 210 and 220. When the representative ECU 200 has not received the version information from at least one of the cooperative ECUs 210 and 220 (NO in Step S51), the process proceeds to Step S52. When the representative ECU 200 has received the pieces of version information from both the cooperative ECUs 210 and 220 (YES in Step S51), the process proceeds to Step S54.

In Step S52, the representative ECU 200 determines whether a predetermined first period has elapsed since the startup check process was started (whether timeout has occurred). When the first period has not elapsed (NO in Step S52), the representative ECU 200 returns the process to Step S50. When the first period has elapsed (YES in Step S52), the representative ECU 200 determines that the timeout has occurred, and advances the process to Step S53.

In Step S53, the representative ECU 200 determines that any abnormality has occurred, and determines to forbid the execution of the system process. Further, the representative ECU 200 determines to forbid the execution of the standalone process. Then, the representative ECU 200 generates the third startup signals including information indicating the abnormality. Then, the process proceeds to Step S58. The representative ECU 200 may include, in the third startup signal, a command to forbid the execution of the system process and the standalone process.

In Step S54, the representative ECU 200 reads the combination information from the memory 202. The representative ECU 200 refers to the combination information to check the product number (version) of the software product stored in the startup storage area of the representative ECU 200 and the product numbers (versions) identified by the pieces of version information received from the cooperative ECUs 210 and 220 in Step S50. Thus, the representative ECU 200 makes determination on the consistency of the combination.

In Step S55, the representative ECU 200 determines whether all the versions are consistent based on the result of the comparison in Step S54. When the representative ECU 200 determines that all the versions are consistent (YES in Step S55), the process proceeds to Step S56. When the representative ECU 200 determines that the versions are inconsistent (NO in Step S55), the process proceeds to Step S57. The process of Steps S52, S54, and S55 corresponds to the version check.

In Step S56, the representative ECU 200 determines that the software products are consistent, and determines to permit the execution of the system process. Then, the representative ECU 200 generates the first startup signals including information indicating the consistency. Then, the process proceeds to Step S58. The representative ECU 200 may include, in the first startup signal, a command to permit the execution of the system process and the standalone process.

In Step S57, the representative ECU 200 determines that the software products are inconsistent, and determines to forbid the execution of the system process. The representative ECU 200 determines to permit the execution of the standalone process. The representative ECU 200 generates the second startup signals including information indicating the inconsistency. Then, the process proceeds to Step S58. The representative ECU 200 may include, in the second startup signal, a command to forbid the execution of the system process and permit the execution of the standalone process.

In Step S58, the representative ECU 200 transmits the startup signals (first startup signals, second startup signals, or third startup signals) to the cooperative ECUs 210 and 220.

Figure 8:
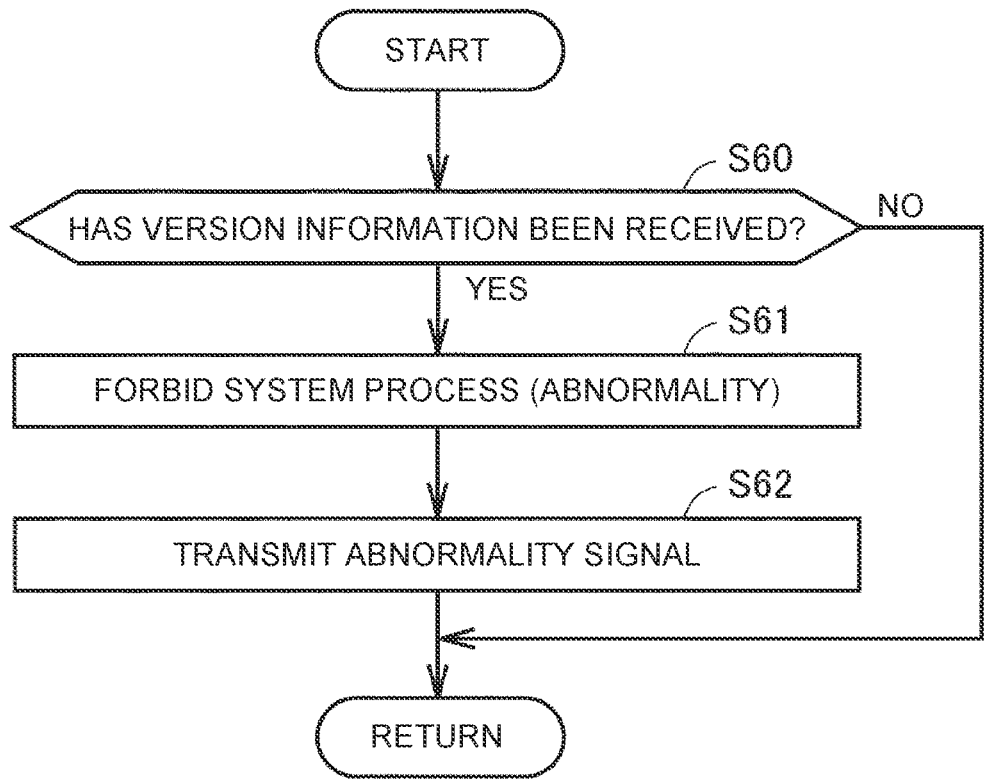
FIG. 8 is a flowchart showing a procedure of a process to be executed by the representative ECU during execution of a normal process.

FIG. 8 is a flowchart showing a procedure of a process to be executed by the representative ECU 200 during execution of the normal process. The process in the flowchart of FIG. 8 is executed in parallel with the normal process (system process or standalone process), called from the main routine in each control cycle, and executed repeatedly.

In Step S60, the representative ECU 200 determines whether the version information has been received from the cooperative ECU 210 or 220. When the representative ECU 200 determines that the version information has not been received (NO in Step S60), the process returns to the main routine (the process in FIG. 8 is terminated). When the representative ECU 200 determines that the version information has been received (YES in Step S60), the process proceeds to Step S61.

In Step S61, the representative ECU 200 determines that the cooperative ECU that has transmitted the version information has been restarted, and determines to stop or forbid the execution of the system process. Further, the representative ECU 200 determines to forbid the execution of the standalone process. Then, the representative ECU 200 generates abnormality signals, and advances the process to Step S63.

In Step S62, the representative ECU 200 transmits the abnormality signals to the cooperative ECUs 210 and 220.

Figure 9:
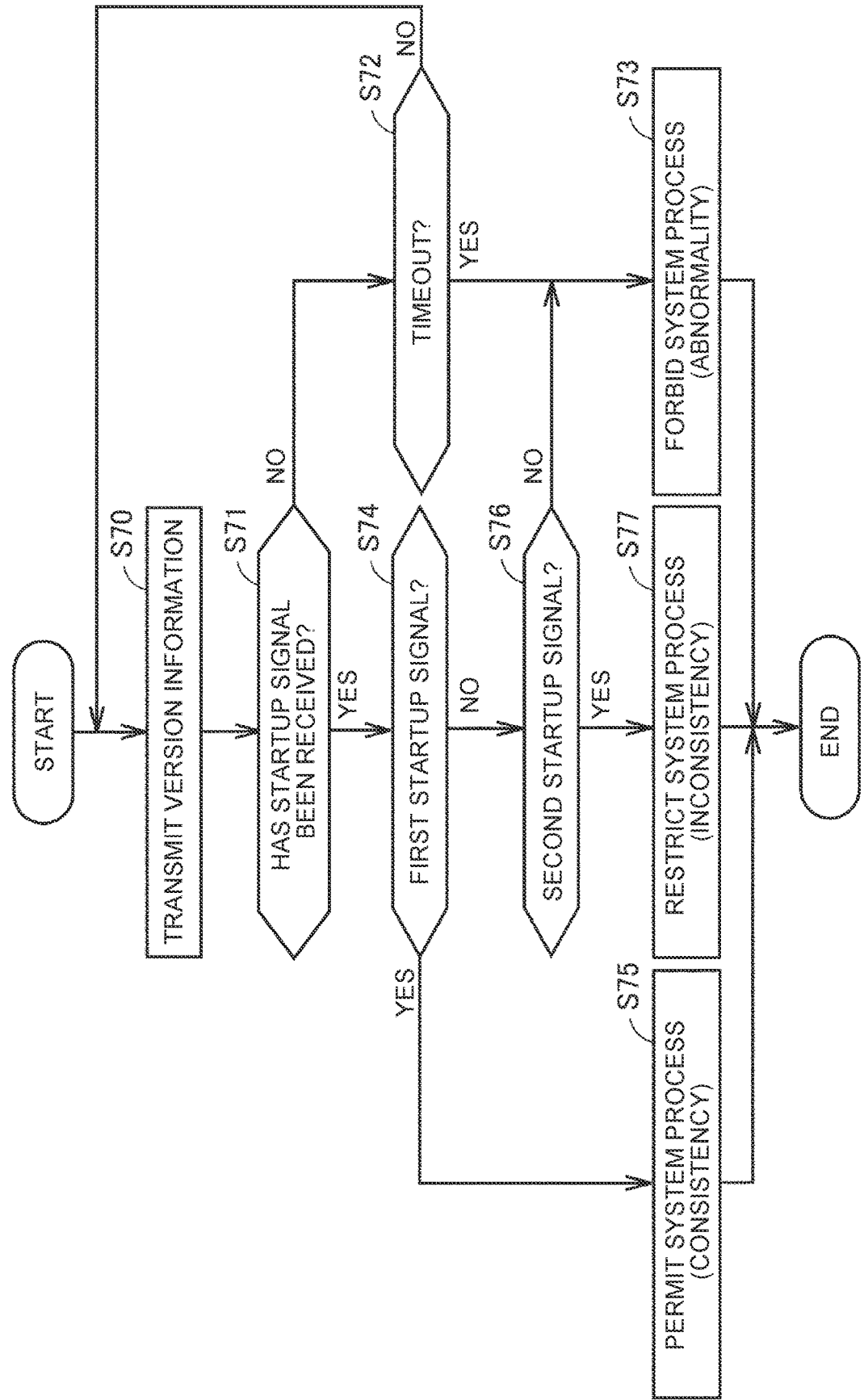
FIG. 9 is a flowchart showing a procedure of a startup check process to be executed by each cooperative ECU.

FIG. 9 is a flowchart showing a procedure of the startup check process to be executed by each cooperative ECU. The process in the flowchart of FIG. 9 is started when the cooperative ECU is started. The steps in the flowchart of FIG. 9 and in a flowchart of FIG. 10 described later will be described as being realized by software processes by the cooperative ECU. A part or all of the steps may be realized by hardware (electric circuit) produced in the cooperative ECU.

In Step S70, the cooperative ECU starts the startup check process and transmits version information to the representative ECU 200.

In Step S71, the cooperative ECU determines whether the startup signal has been received from the representative ECU 200. When the cooperative ECU determines that the startup signal has not been received from the representative ECU 200 (NO in Step S71), the process proceeds to Step S72. When the cooperative ECU determines that the startup signal has been received from the representative ECU 200 (YES in Step S71), the process proceeds to Step S74.

In Step S72, the cooperative ECU determines whether a predetermined second period has elapsed since the startup check process was started (whether timeout has occurred). The second period can be set, for example, to a period equal to or longer than the first period described above. When the second period has not elapsed (NO in Step S72), the cooperative ECU returns the process to Step S70. When the second period has elapsed (YES in Step S72), the cooperative ECU determines that the timeout has occurred, and advances the process to Step S73.

In Step S73, the cooperative ECU determines that any abnormality has occurred, and determines to forbid the execution of the system process. Further, the cooperative ECU determines to forbid the execution of the standalone process.

In Step S74, the cooperative ECU determines whether the startup signal received in Step S71 is the first startup signal. When the cooperative ECU determines that the first startup signal has been received (YES in Step S74), the process proceeds to Step S75. When the cooperative ECU determines that the first startup signal has not been received (NO in Step S74), the process proceeds to Step S76.

In Step S75, the cooperative ECU determines to permit the execution of the system process based on the first startup signal. Further, the cooperative ECU determines to permit the execution of the standalone process based on the first startup signal.

In Step S76, the cooperative ECU determines whether the startup signal received in Step S71 is the second startup signal. When the cooperative ECU determines that the second startup signal has been received (YES in Step S76), the process proceeds to Step S77. When the cooperative ECU determines that the second startup signal has not been received (NO in Step S76), the process proceeds to Step S73.

In Step S77, the cooperative ECU determines to forbid the execution of the system process based on the second startup signal. Further, the cooperative ECU determines to permit the execution of the standalone process based on the second startup signal.

Figure 10:
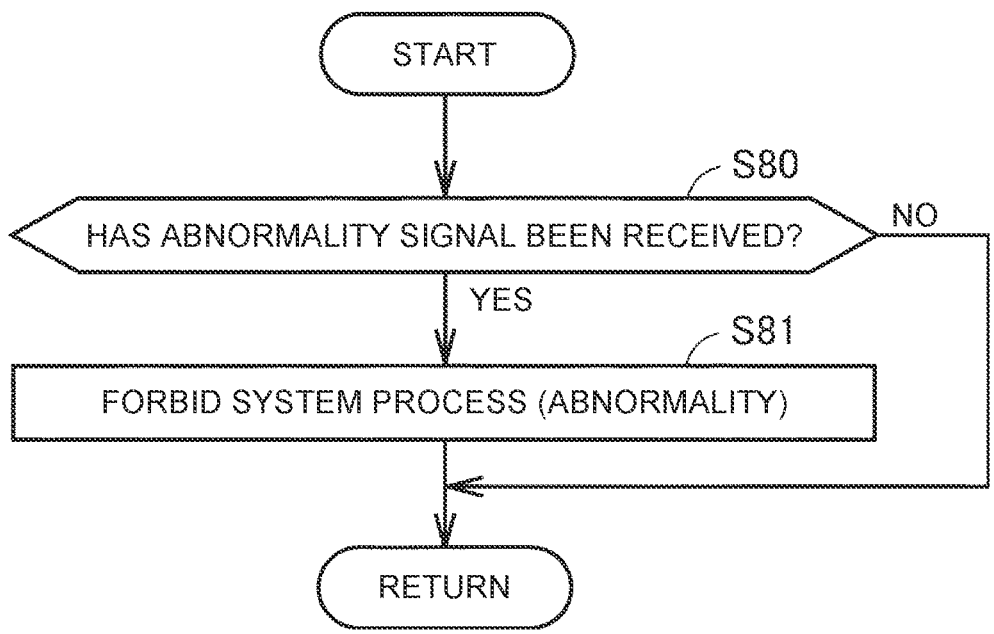
FIG. 10 is a flowchart showing a procedure of a process to be executed by each cooperative ECU during execution of a normal process.

FIG. 10 is a flowchart showing a procedure of a process to be executed by each cooperative ECU during execution of the normal process. The process in the flowchart of FIG. 10 is executed in parallel with the normal process (system process or standalone process), called from the main routine in each control cycle, and executed repeatedly.

In Step S80, the cooperative ECU determines whether the abnormality signal has been received from the representative ECU 200. When the cooperative ECU determines that the abnormality signal has not been received (NO in Step S80), the process returns to the main routine. When the cooperative ECU determines that the abnormality signal has been received (YES in Step S80), the process proceeds to Step S81.

In Step S81, the cooperative ECU determines to forbid the execution of the system process. Further, the cooperative ECU determines to forbid the execution of the standalone process.

As described above, when the electrified vehicle 100 is brought into the IG-ON state and the representative ECU 200 and the cooperative ECUs 210 and 220 are started, the representative ECU 200 and the cooperative ECUs 210 and 220 execute the startup check process once before the execution of the software products for implementing various functions. After the startup check process, determination is made as to whether various processes (system process and standalone process) can be executed based on the result of the startup check process, and the normal process is started. When the representative ECU 200 or the cooperative ECU is restarted after the start of the normal process, the representative ECU 200 transmits the abnormality signal to stop the system process. When the cooperative ECU is restarted, the representative ECU 200 transmits the abnormality signal to the cooperative ECU in response to reception of the version information while the representative ECU 200 is executing the normal process. When the representative ECU 200 is restarted, the representative ECU 200 transmits the abnormality signal to the cooperative ECU in response to the occurrence of timeout without reception of the version information by the representative ECU 200. In this way, when the software products may become inconsistent due to restart or the like after the execution of the startup check process before the execution of the software products, the abnormality signal is transmitted to forbid the system process in the representative ECU 200 and the cooperative ECU. Therefore, it is possible to suppress the execution of the system process when the software products are inconsistent.

Since the startup check process is executed once at the startup, the version information is not sent from the cooperative ECU to the representative ECU 200 after the startup process unless the restart or the like occurs. Therefore, when the representative ECU 200 receives the version information from the cooperative ECU during the execution of the process, the representative ECU 200 can determine that there is an abnormality without executing the version check. Thus, computational resources can be saved compared to a case where the representative ECU 200 periodically receives the version information and executes the version check.

When there is software inconsistency, the system process is forbidden and the standalone process is permitted. By permitting the execution of the standalone process that can be executed even when the software inconsistency occurs, it is possible to suppress excessive restriction on the execution of the process.

When the representative ECU 200 cannot receive the version information within the first period after the start of the startup check process or the cooperative ECU cannot receive the startup signal within the second period after the transmission of the version information, it is assumed that any abnormality has occurred. In this case, the execution of the system process and the standalone process is forbidden. Thus, it is possible to suppress the execution of the system process and the standalone process when the abnormality has occurred.

Modification

In the embodiment, the cooperative ECU periodically transmits the version information to the representative ECU 200 in the startup check process. The cooperative ECU may transmit, to the representative ECU 200, a signal indicating that the cooperative ECU has been started in the startup check process, and transmit the version information in response to a request from the representative ECU 200.

When the electrified vehicle 100 is brought into the IG-ON state, electric power is supplied from the power supply to each of the representative ECU 200 and the cooperative ECUs 210 and 220, and the representative ECU 200 and the cooperative ECUs 210 and 220 are started. Then, the representative ECU 200 and the cooperative ECUs 210 and 220 start the startup check process.

When the startup check process is started, the cooperative ECUs 210 and 220 transmit, to the representative ECU 200, signals indicating that the cooperative ECUs 210 and 220 have been started. When the representative ECU 200 receives the signals indicating that the cooperative ECUs have been started during the startup check process, the representative ECU 200 transmits version information transmission requests to the cooperative ECUs that have transmitted the signals.

When the version information transmission requests are received, the cooperative ECUs 210 and 220 transmit the pieces of version information to the representative ECU 200. The representative ECU 200 executes the version check described in the embodiment by using the pieces of version information. The cooperative ECUs 210 and 220 do not start the startup process until they receive the startup signals from the representative ECU 200 after the start of the startup check process. The subsequent process is the same as that of the embodiment, and will not therefore be described repeatedly.

When the representative ECU 200 receives, from at least one of the cooperative ECUs, a signal indicating that it has been started after the start of the normal process, the representative ECU 200 determines that any abnormality has occurred, and transmits the abnormality signals to the cooperative ECUs 210 and 220. The subsequent process is the same as that of the embodiment, and will not therefore be described repeatedly.

As described above, the same effects as those of the embodiment can be obtained even in the configuration of the modification.

The embodiment disclosed herein should be construed as illustrative in all respects and not restrictive. The scope of the present disclosure is shown by the claims rather than by the above description and is intended to include all modifications within the meaning and scope equivalent to the claims.

What is claimed is:

1. A control device constituting a system of a vehicle, the control device comprising a central processing unit (CPU) configured to:
   store first software for executing a predetermined process, the predetermined process including a first process for implementing a first function of the vehicle in cooperation with another control device constituting the system, the control device and the other control device each being configured to update software at startup when software update is available;
   execute the first software;
   receive information about second software stored in the other control device from the other control device before execution of the first software at the startup of the control device, the information about the second software including a program for executing the first process;
   execute a startup check process including a check process for checking consistency between the first software and the second software prior to executing the first process;
   conditionally permit execution of the first process based on a result of the startup check process, wherein the execution of the first process is permitted only if the check process confirms software consistency between the first software and the second software;
   during operation of the control device after startup, monitor for an event indicating that the other control device has restarted or undergone a software update, wherein the CPU is configured to detect a post-startup software inconsistency based on receiving updated software information from the other control device after execution of the first software has started; and
   execute a real-time enforcement process that, in response to detecting the post-startup software inconsistency, immediately stops execution of the first process if already executing, and prevents execution of the first process if not yet started.

2. The control device according to claim 1, wherein:
   the information about the second software is version information of the second software; and
   the CPU is configured to check the consistency based on a combination of a version of the first software and a version of the second software in the startup check process.

3. The control device according to claim 1, wherein the CPU is configured to:
   permit the execution of the first process when a result of the check process shows consistency.

4. The control device according to claim 3, wherein the CPU is configured to, in the startup check process, forbid the execution of the first process when the CPU is not able to receive the information about the second software within a predetermined period after start of the startup check process.

5. The control device according to claim 4, wherein the CPU is configured to, in the startup check process, transmit a signal including information indicating the result of the check process to the other control device.

6. The control device according to claim 1, wherein:
   the predetermined process further includes a second process for implementing a second function of the vehicle by the control device alone; and
   the CPU is configured to
      permit the execution of the first process and the second process when a result of the check process shows consistency,
      forbid the execution of the first process and permit the execution of the second process when the result of the check process shows inconsistency, and
      forbid the execution of the first process and the second process when the CPU is not able to receive the information about the second software within a predetermined period after start of the startup check process.

7. A control device constituting a system of a vehicle, the control device comprising a central processing unit (CPU) configured to:
   store software for executing a predetermined process, the predetermined process including a first process for implementing a first function of the vehicle in cooperation with another control device constituting the system, the control device and the other control device each being configured to update software at startup when software update is available;
   execute the software;
   execute a startup check process prior to executing the first process at the startup of the control device, the startup check process including,
      transmitting information about the software to the other control device,
      receiving a first signal indicating a result of a check process executed by the other control device using the information about the software, the check process being a process for verifying software consistency between the control device and the other control device, and
      conditionally permitting execution of the first process based on a result of the startup check process, wherein execution of the first process is permitted only if the first signal confirms software consistency between the control device and the other control device;
   during operation of the control device after startup, monitor for an event indicating that the other control device has restarted or undergone a software update, wherein the CPU is configured to detect a post-startup software inconsistency based on receiving a second signal from the other control device indicating updated software information after execution of the software has started; and
   execute a real-time enforcement process that, in response to detecting the post-startup software inconsistency, immediately stops execution of the first process if already executing, and prevents execution of the first process if not yet started.

8. The control device according to claim 7, wherein the CPU is configured to, in the startup check process, transmit the information about the software to the other control device at predetermined time intervals.

9. The control device according to claim 8, wherein the CPU is configured to, in the startup check process, stop transmitting the information about the software when the first signal is received.

10. The control device according to claim 7, wherein the information about the software includes version information of the software.

11. The control device according to claim 7, wherein the CPU is configured to:
permit the execution of the first process when the first signal indicates that the result of the check process shows consistency.

12. The control device according to claim 11, wherein the CPU is configured to, in the startup check process, forbid the execution of the first process when the CPU is not able to receive the first signal within a predetermined period after transmission of the information about the software.

13. The control device according to claim 7, wherein:
the predetermined process further includes a second process for implementing a second function of the vehicle by the control device alone; and
the CPU is configured to
permit the execution of the first process and the second process when the first signal indicates that the result of the check process shows consistency,
forbid the execution of the first process and permit the execution of the second process when the first signal indicates that the result of the check process shows inconsistency, and
forbid the execution of the first process and the second process when the CPU is not able to receive the first signal within a predetermined period after transmission of the information about the software.

14. A control method for a control device constituting a system of a vehicle and including first software for executing a predetermined process, the predetermined process including a first process for implementing a function of the vehicle in cooperation with another control device constituting the system, the control device and the other control device each being configured to update software at startup when software update is available, the control method comprising:
receiving information about second software stored in the other control device from the other control device before execution of the first software at the startup of the control device, the information about the second software including a program for executing the first process;
executing a startup check process prior to executing the first process at startup, the startup check process including:
performing a check process for verifying software consistency between the first software and the second software; and
conditionally permitting execution of the first process based on a result of the check process, wherein execution of the first process is permitted only if the check process confirms software consistency between the first software and the second software;
during operation of the control device after startup, monitoring for an event indicating that the other control device has restarted or undergone a software update, wherein the control device detects a post-startup software inconsistency based on receiving updated software information from the other control device after execution of the first software has started; and
executing a real-time enforcement process that, in response to detecting the post-startup software inconsistency, immediately stops execution of the first process if already executing, and prevents execution of the first process if not yet started.

15. A recording medium configured to record a program for executing the control method according to claim 14.

* * * * *